(12) United States Patent
Ikeuchi et al.

(10) Patent No.: US 8,424,092 B2
(45) Date of Patent: Apr. 16, 2013

(54) ELECTRONIC APPARATUS FOR AUTHENTICATING A BATTERY PACK

(75) Inventors: Akira Ikeuchi, Atsugi (JP); Itsuki Nakano, Atsugi (JP); Kenichi Kasai, Tama (JP); Katsuya Suzuki, Tokyo (JP); Kuniharu Suzuki, Tokyo (JP)

(73) Assignees: Mitsumi Electric Co., Ltd., Tokyo (JP); Sony Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 13/227,549

(22) Filed: Sep. 8, 2011

(65) Prior Publication Data
US 2012/0030480 A1    Feb. 2, 2012

Related U.S. Application Data (62) Division of application No. 12/332,566, filed on Dec. 11, 2008, now abandoned.

(30) Foreign Application Priority Data

Dec. 18, 2007  (JP) .................. 2007-326446

(51) Int. Cl.
| | |
|---|---|
| G06F 11/30 | (2006.01) |
| G06F 12/14 | (2006.01) |
| G06F 12/16 | (2006.01) |
| G06F 1/26 | (2006.01) |
| G08B 23/00 | (2006.01) |
| G08B 13/00 | (2006.01) |
| G08B 21/00 | (2006.01) |
| G08B 29/00 | (2006.01) |

(52) U.S. Cl.
USPC .............. 726/24; 726/35; 713/187; 713/188; 713/193; 713/194

(58) Field of Classification Search .................... 726/24; 713/189
See application file for complete search history.

(56) References Cited

U.S. PATENT DOCUMENTS

| | | | |
|---|---|---|---|
| 6,404,862 B1 * | 6/2002 | Holt | 379/93.02 |
| 6,975,092 B2 * | 12/2005 | Edington et al. | 320/106 |
| 7,250,612 B2 * | 7/2007 | Pai-Paranjape et al. | 250/461.1 |
| 7,498,766 B2 * | 3/2009 | Paul et al. | 320/106 |
| 7,667,429 B2 * | 2/2010 | Little | 320/106 |
| 7,683,571 B2 * | 3/2010 | Takamatsu et al. | 320/106 |

(Continued)

FOREIGN PATENT DOCUMENTS

| | | | |
|---|---|---|---|
| EP | 1667305 A1 * | 6/2006 | |
| JP | 2006-164548 | 6/2006 | |
| JP | 2007035479 A * | 2/2007 | |
| JP | 2007070999 A * | 3/2007 | |

OTHER PUBLICATIONS

Extended European Search Report dated Mar. 5, 2012.

(Continued)

*Primary Examiner* — Carolyn B Kosowski
(74) *Attorney, Agent, or Firm* — IPUSA, PLLC (57) ABSTRACT

A battery pack includes at least one rechargeable battery configured to output power; a remaining battery capacity detection unit configured to detect a remaining battery capacity of the at least one rechargeable battery; and a cryptographic unit configured to output a response word in response to an external request word by encrypting the external request word based on a cryptographic algorithm with a common code key.

15 Claims, 6 Drawing Sheets

U.S. PATENT DOCUMENTS

| | | | | |
|---|---|---|---|---|
| 7,697,957 | B2 * | 4/2010 | Pattenden et al. | 455/557 |
| 7,715,884 | B2 * | 5/2010 | Book et al. | 455/572 |
| 7,822,973 | B2 * | 10/2010 | Okaya | 713/155 |
| 7,877,815 | B2 * | 1/2011 | Yoo et al. | 726/34 |
| 7,941,865 | B2 * | 5/2011 | Seman et al. | 726/34 |
| 7,949,872 | B2 * | 5/2011 | Sasaki et al. | 713/168 |
| 7,971,058 | B2 * | 6/2011 | Taylor | 713/168 |
| 8,032,187 | B2 * | 10/2011 | Book et al. | 455/572 |
| 8,102,248 | B2 * | 1/2012 | Yasuda et al. | 340/426.1 |
| 8,196,192 | B2 * | 6/2012 | Schneider | 726/10 |
| 8,278,870 | B2 * | 10/2012 | Little | 320/106 |
| 8,280,439 | B2 * | 10/2012 | Pattenden et al. | 455/557 |
| 8,285,327 | B2 * | 10/2012 | Pattenden et al. | 455/557 |
| 8,296,565 | B2 * | 10/2012 | Taylor | 713/169 |
| 8,301,888 | B2 * | 10/2012 | Taylor | 713/170 |
| 2004/0204182 | A1 | 10/2004 | Angelo et al. | 455/574 |
| 2006/0076924 | A1 * | 4/2006 | Kim et al. | 320/112 |
| 2006/0204004 | A1 * | 9/2006 | Shankar et al. | 380/44 |
| 2007/0069153 | A1 * | 3/2007 | Pai-Paranjape et al. | 250/461.1 |
| 2007/0123303 | A1 * | 5/2007 | Book et al. | 455/557 |
| 2007/0123304 | A1 * | 5/2007 | Pattenden et al. | 455/557 |
| 2007/0192877 | A1 * | 8/2007 | Yoo et al. | 726/34 |
| 2007/0214296 | A1 * | 9/2007 | Takamatsu et al. | 710/63 |
| 2007/0226497 | A1 * | 9/2007 | Taylor | 713/168 |
| 2007/0260892 | A1 * | 11/2007 | Paul et al. | 713/193 |
| 2008/0024268 | A1 * | 1/2008 | Wong et al. | 340/5.8 |
| 2009/0100512 | A1 * | 4/2009 | Schneider | 726/10 |
| 2009/0144399 | A1 * | 6/2009 | Schneider | 709/220 |
| 2009/0186262 | A1 * | 7/2009 | Takahashi et al. | 429/90 |
| 2009/0251300 | A1 * | 10/2009 | Yasuda et al. | 340/426.1 |
| 2010/0024029 | A1 * | 1/2010 | Sasaki et al. | 726/17 |
| 2010/0148721 | A1 * | 6/2010 | Little | 320/106 |
| 2010/0197366 | A1 * | 8/2010 | Pattenden et al. | 455/572 |
| 2010/0197367 | A1 * | 8/2010 | Pattenden et al. | 455/572 |
| 2010/0241853 | A1 * | 9/2010 | Taylor | 713/168 |
| 2010/0268946 | A1 * | 10/2010 | Taylor | 713/168 |
| 2012/0322513 | A1 * | 12/2012 | Pattenden et al. | 455/572 |
| 2012/0328094 | A1 * | 12/2012 | Pattenden et al. | 380/28 |

OTHER PUBLICATIONS

Menezes et al: "Handbook of Applied Cryptography, Passage", Jan. 1, 1997, Handbook of Applied Cryptography; [CRC Press Series on Discrete Mathematices and Its Applications], CRC Press Series on Discrete Mathematics and Its Applications, Boca Raton, FL, US, pp. 497-552, XP002248262.

* cited by examiner

ELECTRONIC APPARATUS FOR AUTHENTICATING A BATTERY PACK

CROSS-REFERENCE TO RELATED APPLICATIONS

This application is a divisional application of a U.S. patent application Ser. No. 12/332,566 filed on Dec. 11, 2008, now abandoned the entire disclosure of which is hereby incorporated by reference.

BACKGROUND OF THE INVENTION

1. Field of the Invention

The present invention relates to a battery pack which includes a rechargeable battery and is detachably connected to an electronic apparatus, and an electronic apparatus which receives power from such a battery pack.

2. Description of the Related Art

Most battery packs on the market do not include a function that enables authentication. The battery pack can be used if the outer shape and terminal positions of the battery pack conform to an electronic apparatus even if the battery pack is not a regular or an authenticated battery pack designed for the electronic apparatus. In general, a battery pack using a secondary battery (rechargeable battery), such as a lithium ion battery, includes a protection function in order to ensure the safety of users during charging and discharging of the battery. However, there is often a problem that a copy or unauthenticated battery pack has an insufficient protection function or does not even include a protection function. In this case, there is a possibility of causing a serious accident which may endanger the users.

In order to prevent the use of the unauthenticated battery pack, a battery pack has been developed which includes a circuit that can store identification information such as a serial number of the battery pack in a storage device such as an EEPROM. A simple authentication procedure is performed by a main apparatus to which the battery pack is connected. One example of the battery pack which can be used for such a simple authentication procedure is proposed in a Japanese Patent Application Publication No. 2006-164548.

However, although the battery pack is designed to enable the simple authentication procedure described above, an unauthenticated battery pack cannot be prevented from being used if the unauthenticated battery pack includes a similar storage device that stores a copy of the identification information. Thus, there is a problem that the simple authentication procedure would become ineffective.

This invention takes into consideration the problem described above, and thus one of objects of this invention is to provide a battery pack and an electronic apparatus with an authentication function that is difficult to copy.

SUMMARY OF THE INVENTION

Accordingly, embodiments of the present invention may provide a novel and useful way for solving one or more of the problems discussed above.

More specifically, the embodiments of the present invention may provide a battery pack and an electronic apparatus.

One aspect of the present invention may be to provide a battery pack which includes a rechargeable battery and is detachably connected to an electronic apparatus a battery pack that includes at least one rechargeable battery configured to output power; a remaining battery capacity detection unit configured to detect a remaining battery capacity of the at least one rechargeable battery; and a cryptographic unit configured to output a response word in response to an external request word by encrypting the external request word based on a cryptographic algorithm with a common code key.

Another aspect of the present invention may be to provide an electronic apparatus that includes a transmission unit configured to output a request word in response to external power; a reception unit configured to receive an external response word; an encryption unit configured to encrypt the request word based on a cryptographic algorithm with a common code key; and a collation unit configured to collate the encrypted request word which has been encrypted by the encryption unit and the external response word.

Other objects, features, and advantages of the present invention will become more apparent from the following detailed description when read in conjunction with the accompanying drawings.

DETAILED DESCRIPTION OF THE PREFERRED EMBODIMENTS

Preferred embodiments will be described in the following with reference to the drawings.

Figure 1:
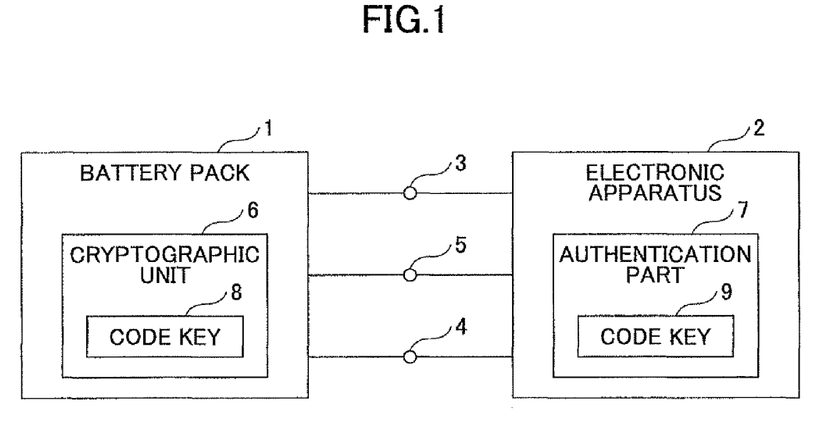
FIG. 1 shows a block diagram of a system provided by a battery pack and an electronic apparatus of an embodiment.

FIG. 1 shows a block diagram describing a system composed of a battery pack and an electronic apparatus according to this embodiment.

A battery pack 1 and an electronic apparatus 2 are connected to each other via terminals 3, 4 and 5. A first terminal 3 and second terminal 4 correspond to an anode and a cathode, respectively, to supply (output) power (external power) from the battery pack 1 to the electronic apparatus 2. A third terminal 5 is used as a communication terminal to perform communication between the battery pack 1 and the electronic apparatus 2.

The battery pack 1 communicates with the electronic apparatus 2 through the terminal 5 (communication terminal 5), and includes a cryptographic unit 6 which generates a code (a response word) based on a common cryptographic algorithm using a common code key 8 which is the same as a common code key 9 used in the electronic apparatus 2. Likewise, the electronic apparatus 2 communicates with the battery pack 1 through the communication terminal 5, and includes an authentication part 7 which performs an authentication procedure based on the cryptographic algorithm and the common code key 9 (identical to the cryptographic algorithm with the common code key 8 used by the battery pack 1).

In the following, a more detailed description will be given for each configuration of the battery pack 1 and the electronic apparatus 2.

[Configuration of Battery Pack]

Figure 2:
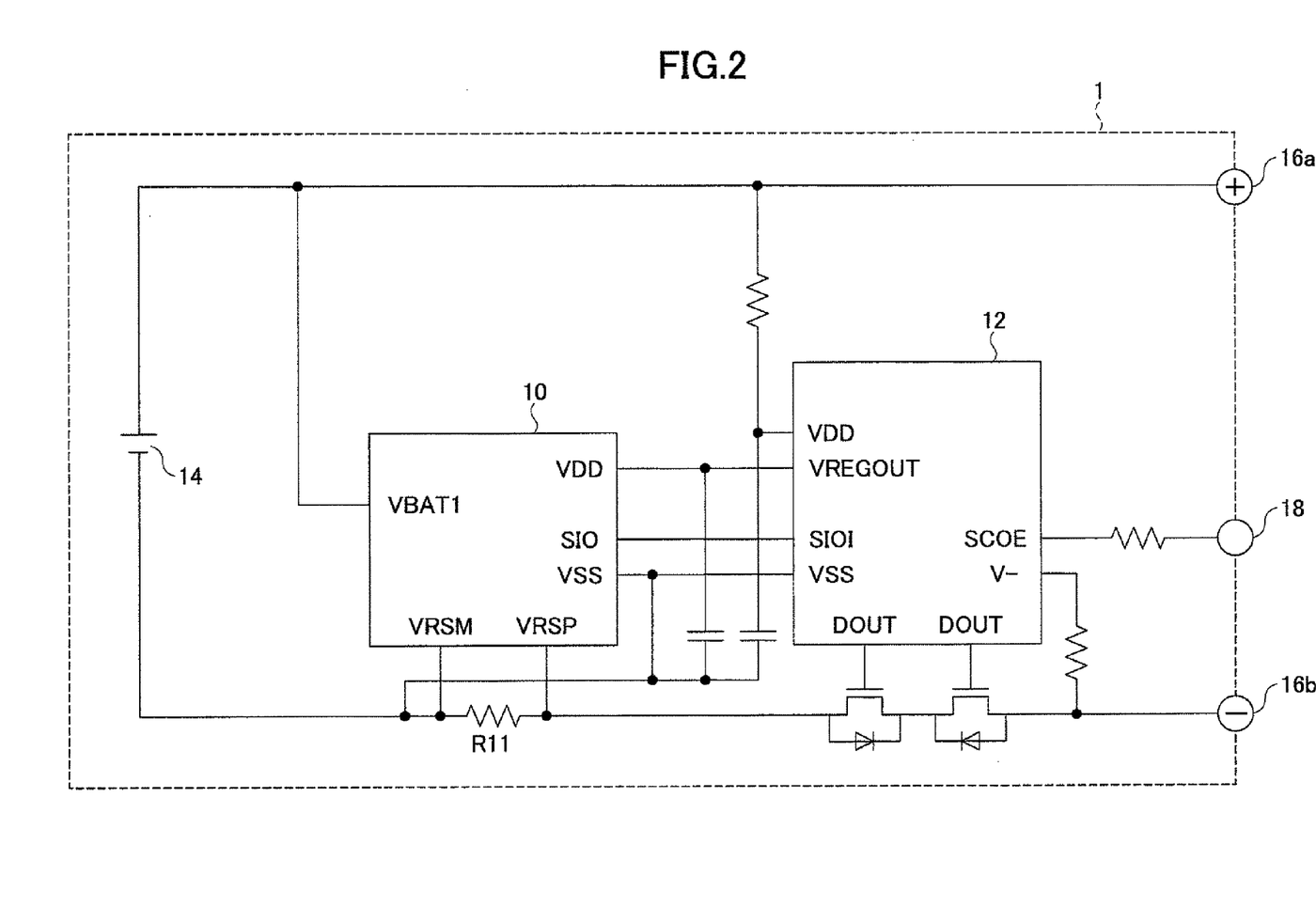
FIG. 2 shows a circuit diagram of the battery pack of the embodiment.

FIG. 2 is a circuit diagram of the battery pack 1 according to this embodiment.

The battery pack 1 of FIG. 2 includes at least one rechargeable battery 14 (hereafter, at least one rechargeable battery is simply referred to as "the rechargeable battery" or "the battery"), such as a lithium ion battery or the like. Further, the battery pack 1 includes an anode terminal 16a, a cathode terminal 16b and a communication terminal 18 to connect to the electronic apparatus 2 (the battery pack is detachably connected to the electronic apparatus 2), as shown in FIG. 1. The battery pack 1 includes a remaining battery capacity detection IC 10 and a battery protection IC 12 between the terminals 16a, 16b and 18 and the battery 14.

The remaining battery capacity detection IC 10 is a circuit which detects a remaining capacity of the battery 14 and includes a power supply terminal VDD, a reference electrical potential terminal VSS, a voltage detection terminal VBAT1, a pair of current detection terminals VRSP and VRSM, and a communication terminal SIO. The remaining battery capacity detection IC 10 receives voltage through the power supply terminal VDD, in which the voltage from the battery 14 is regulated at the battery protection IC 12. The reference electric potential terminal VSS is connected to the cathode of the battery 14. The remaining battery capacity detection IC 10 can detect the output voltage of the battery 14 through the voltage detection terminal VBAT1 which is connected to the anode of the battery 14. One of the current detection terminals, the current detection terminal VRSM, is connected to the cathode of the battery 14 and connected to another current detection terminal, the current detection terminal VRSP via an external resistor R11 at outside of the remaining battery capacity detection IC 10. The remaining battery capacity detection IC 10 can detect a current flowing through the external resistor R11 by the current detection terminals VRSP and VRSM, that is, the remaining battery capacity detection IC 10 can detect the charge or discharge current of the battery 14. The communication terminal SIO is connected to the communication terminal 18 through the battery protection IC 12 in which the communication terminal 18 is used for the communication with the electronic apparatus 2. The remaining battery capacity detection IC 10 can communicate with the electronic apparatus 2 over the communication terminal SIO.

Figure 3:
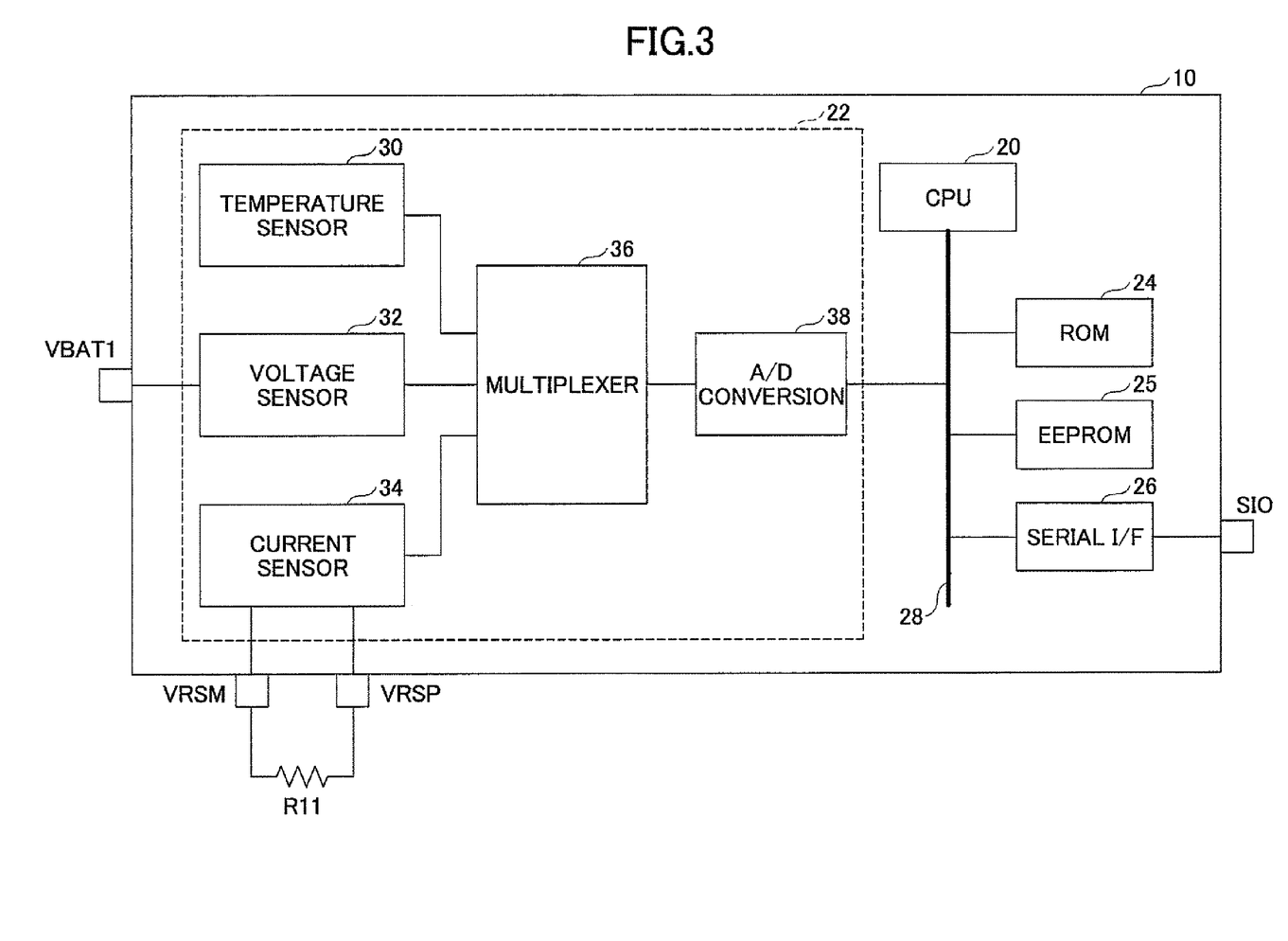
FIG. 3 shows a block diagram of a remaining battery capacity detection integrated circuit (IC) of the embodiment.

FIG. 3 is a block diagram expressing a hardware configuration of the remaining battery capacity detection IC 10 shown in FIG. 2.

In FIG. 3, the remaining battery capacity detection IC 10 includes a CPU (Central Processing Unit) 20, a sensor part 22, a ROM (Read Only Memory) 24, an EEPROM (Electrically Erasable and Programmable ROM) 25, and a serial interface (I/F) 26. For example, the EEPROM is a type of nonvolatile memory.

The CPU 20 can control each part of the remaining battery capacity detection IC 10. The sensor part 22 can detect a voltage, a current, and temperature of the battery 14 (see FIG. 1). The ROM 24 can store a program which the CPU 20 executes to control each part of the remaining battery capacity detection IC 10. The EEPROM 25 can store individual parameters of the battery 14, such as a voltage value, a current value, temperature or the like detected by the sensor part 22, and information on a common code key or the like used by the cryptographic algorithm which is used to enable the authentication procedure with the electronic apparatus 2 (see FIG. 1). The serial I/F 26 can communicate with the electronic apparatus 2 through the communication terminal SIO. The CPU 20, the sensor part 22, the ROM 24, the EEPROM 25 and the serial I/F 26 are connected via a bus 28, and can exchange data and programs with each other.

Also, the sensor part 22 includes a temperature sensor circuit 30, a voltage sensor circuit 32, a current sensor circuit 34, a multiplexer 36, and an analog-to-digital (A/D) conversion circuit 38.

The temperature sensor circuit 30 can detect the temperature of the battery 14. The voltage sensor circuit 32 can detect the output voltage of the battery 14 via the voltage detection terminal VBAT1 connected to the battery 14. The electric current sensor circuit 34 can detect a current flow through the external resistor R11 via the current detection terminals VRSP and VRSM. Namely, the electric current sensor circuit 34 can detect the charge or discharge current of the battery 14. Outputs of the temperature sensor circuit 30, the voltage sensor circuit 32 and the electric current sensor circuit 34 are connected to the multiplexer 36, and the multiplexer 36 outputs those signal values as a single signal. The A/D conversion circuit 38 can convert the signal output by the multiplexer 36 from an analog signal to a digital signal.

The remaining battery capacity detection IC 10 executes a remaining capacity detection program stored in the ROM 24 so that a remaining capacity of the battery 14 can be detected based on the voltage, the charge or discharge current, and temperature detected by the sensor part 22.

Further, in this embodiment, the cryptographic unit 6 of FIG. 1 is stored in the ROM 24 as a program. The remaining battery capacity detection IC 10 can respond to the electronic apparatus 2 for enabling the authentication procedure by the electronic apparatus 2 by causing the CPU 20 to execute a cryptographic program stored in the ROM 24 with the common code key stored in the EEPROM 25.

Figure 4:
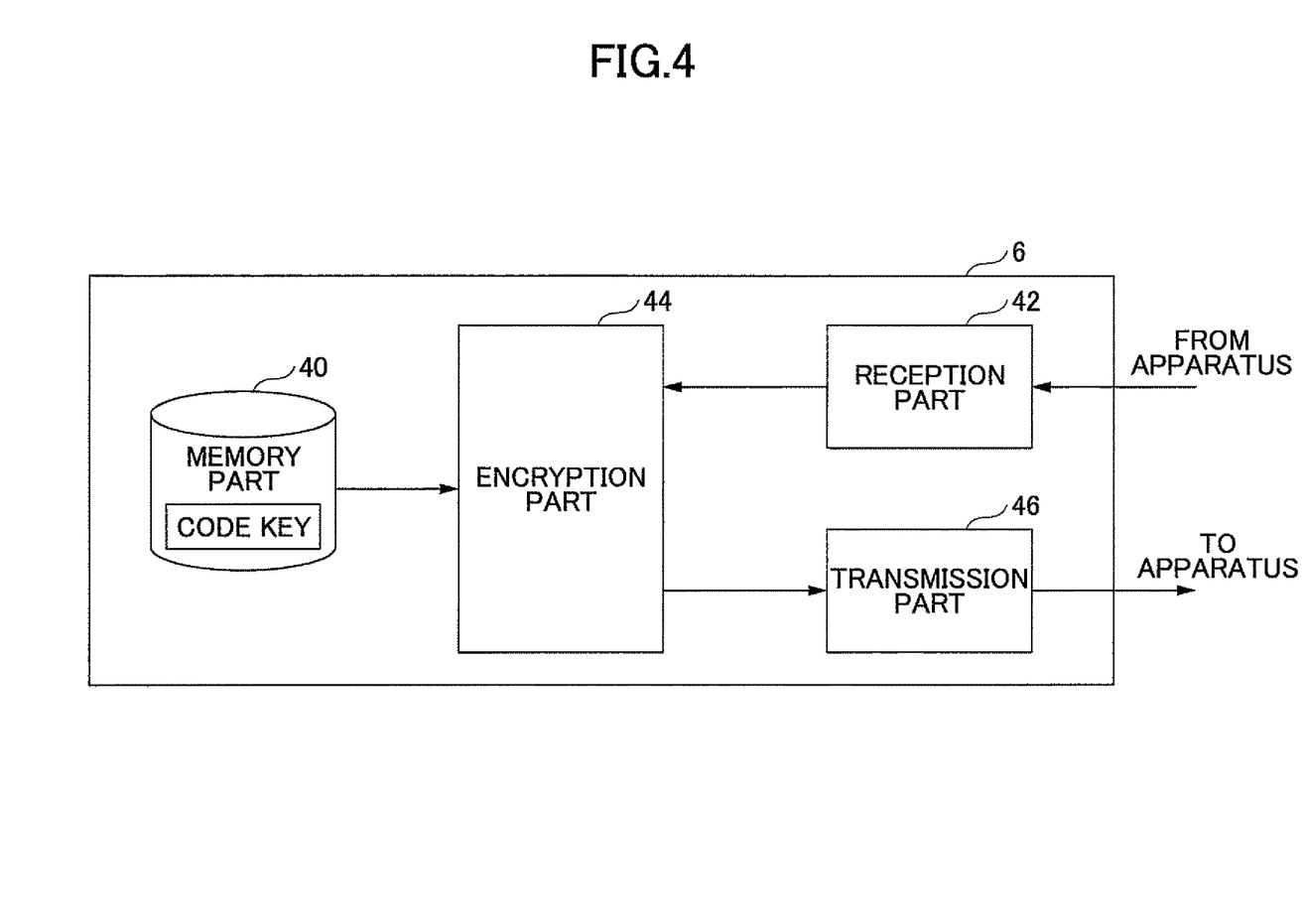
FIG. 4 shows a block diagram describing a functional configuration of an encryption part included in the remaining battery capacity detection IC of the embodiment.

FIG. 4 is a block diagram expressing a functional configuration of the cryptographic unit 6 included in the remaining battery capacity detection IC 10 of this embodiment. Further, in this embodiment, the functional configuration of the cryptographic unit 6 shown in FIG. 4 is provided by a specific program stored in the ROM 24 of FIG. 3. Of course, in other embodiments, a hardware module achieving the functional configuration of the cryptographic unit 6 may be provided separately from other constituents of the hardware configuration of FIG. 3.

In FIG. 4, the cryptographic unit 6 includes a memory part 40, a reception part 42, an encryption part 44 and a transmission part 46.

The memory part 40 can store the common code key used in the cryptographic algorithm, which is used in the electronic apparatus 2 with the same common code key (the cryptographic algorithm and the common code key are identical to those used by the electronic apparatus 2). For example, the memory part 40 may be provided in part of a memory region of the EEPROM 25 (nonvolatile memory) shown in FIG. 3.

The reception part 42 can receive a request word (external request word) from the electronic apparatus 2 for enabling the authentication procedure. Specifically, the reception part 42 can cause the serial I/F 26 of FIG. 3 to receive the request word transmitted (output) from the electronic apparatus 2. For example, the request word may be data of random numbers, and it is preferable that the request word is varied for every authentication procedure so that it is effective in preventing the manufacturing of an unauthenticated battery.

The encryption part 44 ciphers (encrypts) the request word received by the reception part 42 based on the cryptographic algorithm with the common code key (identical to the cryptographic algorithm with the common code key used by the electronic apparatus) stored in the memory part 40, and generates (outputs) a response word (code).

The transmission part 46 can transmit the response word generated by the encryption part 44 to the electronic apparatus 2. Specifically, the transmission part 46 can cause the serial I/F 26 of FIG. 3 to transmit (output) the response word to the electronic apparatus 2.

[Configuration of Electronic Apparatus]

Figure 5:
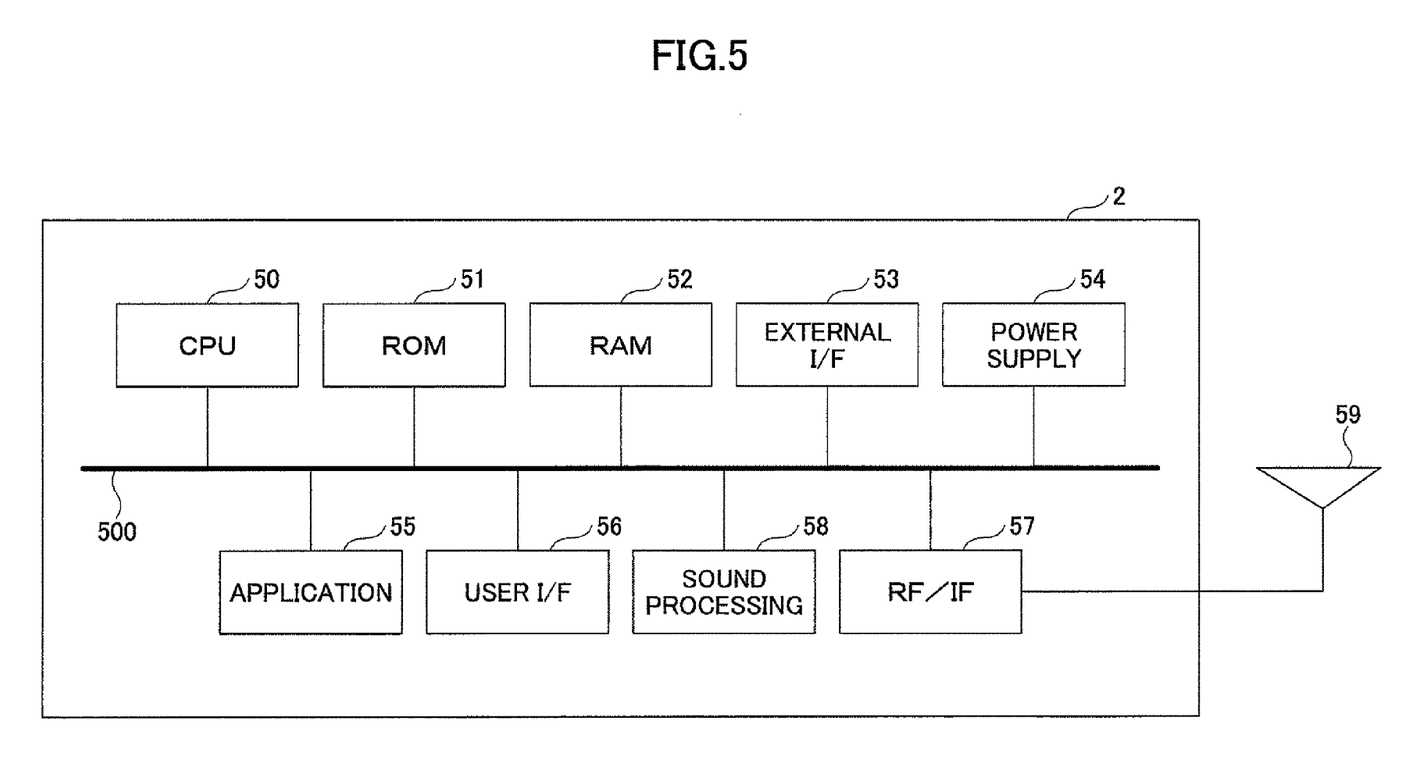
FIG. 5 is a drawing describing a hardware configuration of the electronic apparatus of the embodiment.

FIG. 5 is a drawing showing a hardware configuration of the electronic apparatus 2 according to this embodiment. In this embodiment, the electronic apparatus 2 is described as a portable phone as an example of an apparatus receiving power (external power) from a battery pack which includes a rechargeable battery. The battery pack is detachably connected to the electronic apparatus 2. Of course, this invention may be applied to a portable music player, a game device or other electronic apparatuses.

In FIG. 5, the electronic apparatus 2 includes a CPU 50, a ROM 51, a RAM 52, an external interface (I/F) 53, a power supply part 54, an application 55, a user I/F (interface) 56, a radio frequency interface (RF/IF) 57, and a sound processing part 58. These components are connected by a bus 500, and each component can exchange data or programs with each other.

The CPU 50 can control each part of the electronic apparatus 2. The ROM 51 can store a program so that the CPU 50 executes the program to control each part of the electronic apparatus 2. The RAM 52 can store data which are used when the CPU 50 executes the program stored in the ROM 51.

The external I/F 53 can communicate with the battery pack 1 through the communication terminal 5 as shown in FIG. 1. The power supply part 54 receives electric power (external power) from the battery pack 1 through the anode terminal 3 and the cathode terminal 4 shown in FIG. 1, and can distribute the power to each part of the electronic apparatus 2.

The application 55 can perform functions of the electronic apparatus 2 required as a portable phone. For example, the functions include capabilities of a phone, E-mail communication, Internet access, a camera, a television, a game or the like.

The user I/F 56 includes an operation part to be operated by a user and a display which shows user information for the user.

The RF/IF 57 can transmit and receive analog sound signals through the antenna 59 based on RF communication. The sound processing part 58 can convert the analog sound signals transmitted and received by the RF/IF 57 into digital sound signals.

The electronic apparatus 2 stores the authentication part 7 of FIG. 1 as a program in the ROM 51, and also stores the cryptographic algorithm and the common code key in the RAM 52, in which the common code key is used by the cryptographic algorithm of the authentication part 7 and the cryptographic algorithm and the common code key are identical to those used by the battery pack 1. Thus, the electronic apparatus 2 can perform authentication with the battery pack 1 using the same common code key stored in the RAM 52 by causing the CPU 50 to execute an authentication program stored in the ROM 51.

Figure 6:
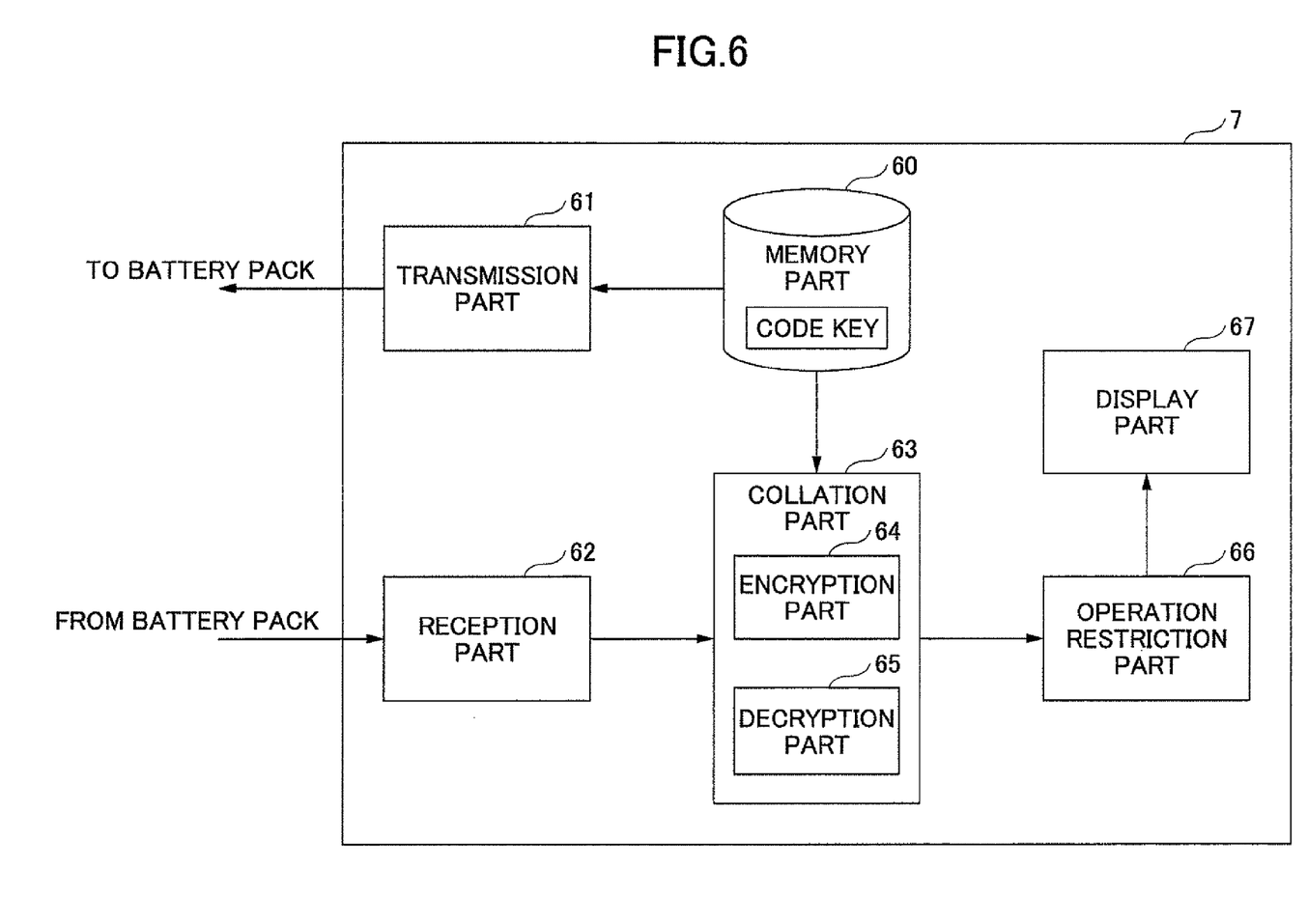
FIG. 6 shows a block diagram describing a functional configuration of an authentication part included in the electronic apparatus of the embodiment.

FIG. 6 is a block diagram showing a functional configuration of the authentication part 7 included in the electronic apparatus 2 according to this embodiment. Further, in this embodiment, the functional configuration of the authentication part 7 shown in FIG. 6 is provided by a specific program stored in the ROM 51 of FIG. 5. Of course, in other embodiments, a hardware module forming the functional configuration of the authentication part 7 may be provided separately from other components in the hardware configuration of FIG. 5.

In FIG. 6, the authentication part 7 includes a memory part 60, a transmission part 61, a reception part 62, a collation part 63, an encryption part 64, a decryption part 65, an operation restriction part 66 and a display part 67.

The memory part 60 can store the common code key used in the cryptographic algorithm. For example, the memory part 60 may be provided in part of the memory region of the RAM 52 of FIG. 5.

The transmission part 61 can transmit (output) a request word (external request word) to the battery pack 1 for the authentication procedure. Specifically, the transmission part 61 can cause the external I/F 53 of FIG. 5 to transmit the request word.

The reception part 62 can receive a response word (external response word) from the battery pack 1. Specifically, the reception part 62 can cause the external I/F 53 of FIG. 5 to receive the response word transmitted from the battery pack 1. The response word is a signal from which the battery pack has ciphered (encrypted) the request word transmitted (output) by the electronic apparatus 2 by using the common code key of the battery pack 1, as described for the battery pack 1 referring to FIG. 4.

In this embodiment, the collation part 63 includes the encryption part 64 and the decryption part 65 as illustrated in FIG. 6. The encryption part 64 can encrypt the request word which is the same as the request word transmitted to the battery pack 1 by the transmission part 61 based on the cryptographic algorithm and the common code key (the cryptographic algorithm and the common code key are identical to those used by the battery pack 1) stored in the memory part 60. The decryption part 65 can decrypt the response word received from the battery pack 1 by the reception part 62 based on the cryptographic algorithm and the common code key (the cryptographic algorithm and the common code key are identical to those used by the battery pack 1) stored in the memory part 60. The collation part 63 can collate the response word from the battery pack 1 received by the reception part 62 with an encrypted request word having been encrypted (coded) by the encryption part 64. Further or alternatively, the collation part 63 can collate a decrypted response word decrypted by the decryption part 65 with the request word transmitted to the battery pack 1 by the transmission part 61. When a collation result is a "match", the electronic apparatus 2 determines the battery pack 1 to be an appropriate battery pack, having the common code key.

The operation restriction part 66 can prohibit the operation of the electronic apparatus 2 or restrict some of the operation of the electronic apparatus 2 when the battery pack 1 has been determined as an inappropriate battery pack.

When a prohibition of the operation or a restriction of part of the operation of the electronic apparatus 2 is made by the operation restriction part 66, the display part 67 can indicate that information to notify a user. Specifically, the display part 67 can cause the user I/F 56 of FIG. 5 to indicate that the operation of the electronic apparatus 2 is prohibited or part of the operation of the electronic apparatus 2 is restricted. When part of the operation of the electronic apparatus 2 is restricted, information about the restricted function can be displayed.

The authentication procedure is not limited to the above request/response method. Further or alternatively, the authentication part 7 may perform code communication with the battery pack 1 and the authentication procedure may be performed based on an establishment of the code communication with the battery or matching of the communication contents.

In the following, the operation of the authentication will be described by referring especially to FIG. 4 and FIG. 6 using the battery pack 1 and the electronic apparatus 2 which include the components described above by referring to FIG. 2 through FIG. 6.

[Operation]

When the battery pack 1 is connected to the electronic apparatus 2, power (external power) is supplied (input) to the electronic apparatus 2 from the battery pack 1, and then the electronic apparatus 2 first transmits (outputs) a request word (external request word) to the battery pack 1 via the transmission part 61.

The battery pack 1 receives the request word (external request word) transmitted by the electronic apparatus 2 at the reception part 42. Next, the battery pack 1 encrypts the request word received with the reception part 42 by the encryption part 44 with the cryptographic algorithm and the common code key stored in the memory part 40 (the cryptographic algorithm and the common code key are identical to those used by the electronic apparatus 2), and generates (outputs) a response word. The battery pack 1 transmits the response word generated (output) by the encryption part 44 through the transmission part 46 to the electronic apparatus 2.

On the other hand, while the response word is generated in the battery pack 1, the electronic apparatus 2 encrypts the same request word previously transmitted by the transmission part 61 to the battery pack 1 by use of the encryption part 64 with the common code key stored in the memory part 60, and generates an encrypted request word.

Next, after the response word (external response word) is transmitted (output) by the battery pack 1, the electronic apparatus 2 receives this response word in the reception part 62. Next, the electronic apparatus 2 collates the response word from the battery pack 1 received by the reception part 62 with the encrypted request word having been encrypted previously in the encryption part 64 in the collation part 63, and confirms whether the response word from the battery pack 1 and the encrypted request word match each other.

Further, or alternatively, the electronic apparatus 2 decrypts the response word from the battery pack 1 received by the reception part 62 by use of the decryption part 65 with the common code key stored in the memory part 60. Next, the electronic apparatus 2 collates the response word decrypted by the decryption part 65 with the request word previously transmitted to the battery pack 1 by the transmission part 61 in the collation part 63, and confirms whether the decrypted response word and the request word match each other.

When a collation result by the collation part 63 is a "match", the electronic apparatus 2 determines the battery pack 1 to be an appropriate battery pack having the common code key. On the other hand, the electronic apparatus 2 determines that the battery pack 1 is unauthenticated when the collation result by the collation part 63 is a "mismatch."

Further, if a battery pack is an unauthenticated product, the battery pack may not include components such as an encryption part or the like provided in the battery pack of this embodiment. In this case, even if the electronic apparatus 2 transmits a request word or other signals, it is expected that there is no reply or a meaningless response from the unauthenticated battery pack. In such a case, the electronic apparatus 2 can determine that the battery pack is unauthenticated.

Thus, there are three methods in which the electronic apparatus 2 determines whether a battery pack 1 is authenticated.

In the first method, a request word (external request word) is transmitted to the battery pack 1, the same request word is encrypted in the electronic apparatus 2, and the response word (external response word) transmitted (output) from the battery pack 1 and the encrypted request word are collated with each other.

In the second method, the response word transmitted from the battery pack 1 is decrypted in the electronic apparatus 2, and the request word previously transmitted to the battery pack 1 and the decrypted response word are collated with each other.

In the third method, the authentication is performed based on the establishment or matching of the communication between the electronic apparatus 2 and the battery pack 1.

For the first method through the third method, one of three methods or a combination of more than two methods above may be used.

When it is determined that a battery pack 1 is not authenticated by these methods, the electronic apparatus 2 can prohibit the operation of the electronic apparatus 2 or restrict part of the operation of the electronic apparatus 2 by use of the operation restriction part 66. Specifically, when the electronic apparatus 2 is a portable phone, the restriction can be planned that the portable phone is available to call but a Web function such as the Internet and E-mail cannot be used.

Further, when the operation of the electronic apparatus 2 is prohibited or part of the operation of the electric apparatus 2 is restricted by the operation restriction part 66, that information can be displayed on the user I/F 56 (see FIG. 5.) by the display part 67. Thereby, the user can realize that the operation of the electronic apparatus 2 is prohibited or part of the operation is restricted.

Further, the common code key included in the battery pack 1 may be renewed in the battery pack 1 by receiving a new common code key transmitted by the electronic apparatus 2. On the other hand, when the electronic apparatus 2 is a portable phone, for example, a new common code key of the electronic apparatus 2 may be acquired by carrier communication with an external server. Further, when the electronic apparatus 2 can connect to a computer such as a PC or the like via a wire or radio communication, the common code key of the electronic apparatus 2 may be acquired by a computer. It is preferable for a common code key used in the cryptographic algorithm to be renewed periodically for maintaining security.

In this manner, a battery pack and an electronic apparatus of this embodiment having an authentication function based on a cryptographic algorithm using a common code key can prevent the use of an unauthenticated battery pack. Therefore, the possibility of risk of an accident which may be caused by using an unauthenticated battery pack attached to an electronic apparatus can be reduced.

Further, when the remaining battery capacity detection circuit is included in a battery pack for detecting a remaining capacity of a battery, the product cost reduction and decrease in the circuit area become possible by applying an authentication function of this invention to this circuit. As a code key is stored in the storage device of a circuit, reading the code key to produce unauthenticated products becomes difficult. Thereby, it becomes possible to provide an electronic apparatus with a battery pack an authentication function that is difficult to copy. The remaining battery capacity detection circuit (unit) includes a processing unit (or central processing unit: CPU) that acquires parameters including the temperature of a battery, the voltage and currents of the battery during charging or discharging or the like. Based on the parameters, the processing unit obtains the remaining battery capacity of the battery. By utilizing the CPU, the encryption (cryptographic) function for enabling authentication becomes possible with the remaining battery capacity detection circuit as hardware or software. Thereby, it is also possible to reduce the manufacturing cost and circuit area of the battery pack. Further, when the encryption (cryptographic) function for enabling authentication is provided in the remaining battery capacity detection unit as software, the cryptographic algorithm can be easily renewed. As a result, it becomes easy to solve a problem in short time at a low cost when the cryptographic algorithm and the common code are decrypted (or copied) to use an unauthenticated battery.

According to this invention, a battery pack and an electronic apparatus can provide a function that enables authentication making it difficult to copy.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2007-326446 filed on Dec. 18, 2007, the entire contents of which are hereby incorporated by reference.

What is claimed is:

1. An electronic apparatus operable with a detachable battery pack supplying external power and an external response word, the electronic apparatus comprising:
 a first transmission unit configured to output a request word in response to the external power;
 a first reception unit configured to receive the external response word;
 a processing unit; and
 a display unit to make a display,
 wherein the processing unit includes
  an encryption unit configured to encrypt the request word based on a cryptographic algorithm with a common code key;
  an authentication unit configured to collate the encrypted request word encrypted by the encryption unit and the external response word in order to judge that the battery pack is authenticated when the collated words match and that the battery pack is unauthenticated when the collated words do not match; and
  an operation restriction unit,
 wherein, when the authentication unit judges that the battery pack is unauthenticated, the operation restriction unit restricts a part of an operation of the electronic apparatus in order to prohibit a Web function but permit a telephone call function, and the display unit makes a display to indicate that a part of the operation is restricted,
 wherein the Web function includes Internet and e-mail functions.

2. The electronic apparatus as claimed in claim 1, wherein the authentication unit includes
 a second transmission unit configured to output the request word to the battery pack which is detachably connected to the electronic apparatus;
 a second reception unit configured to receive the external response word from the battery pack; and
 a collation unit configured to collate the external response word and the encrypted request word;
 wherein the battery pack generates the external response word. using the cryptographic algorithm and the common code key identical to those used by the encryption unit.

3. The electronic apparatus as claimed in claim 1, wherein the authentication unit includes
 a second transmission unit configured to output the request word to the battery pack which is detachably connected to the electronic apparatus;
 a second reception unit configured to receive the external response word from the battery pack;
 a decryption unit configured to decrypt the external response word based on the cryptographic algorithm and the common code key identical to those used by the battery pack; and
 a collation unit configured to collate the decrypted external response word decrypted by the decryption unit and the request word;
 wherein the battery pack generates the external response word using the cryptographic algorithm and the common code key identical to those used by the encryption unit.

4. The electronic apparatus as claimed in claim 1, wherein the authentication unit judges that the battery pack which is detachably connected to the electronic apparatus is unauthenticated when no response word is received from the battery pack.

5. The electronic apparatus as claimed in claim 1, wherein, when the authentication unit judges that the battery pack is unauthenticated, the operation restriction unit prohibits the operation of the electronic apparatus, and the display unit makes a display to indicate that the operation is prohibited.

6. A system comprising:
 an electronic apparatus; and
 a battery pack detachably connected to the electronic apparatus,
 wherein the battery pack includes
  a rechargeable battery configured to output power;
  a detection unit configured to detect a remaining battery capacity of the rechargeable battery; and
  a cryptographic unit configured to receive a request word from the electronic apparatus and output a response word by encrypting the request word based on a cryptographic algorithm with a common code key,
  wherein the cryptographic unit includes a first reception unit configured to receive the request word, a first encryption unit configured to encrypt the request word received by the first reception unit, and a first transmission unit configured to output the response word generated by the first encryption unit,
 wherein the electronic apparatus includes
  a second transmission unit configured to output the request word in response to the power received from the battery pack;
  a second reception unit configured to receive the response word from the battery pack;
  a second encryption unit configured to encrypt the request word based on a cryptographic algorithm with a common code key identical to those used by the first authentication unit of the battery pack;
  an authentication unit configured to collate the encrypted request word encrypted by the second encryption unit and the response word in order to judge that the battery pack is authenticated when the collated words match and that the battery pack is unauthenticated when the collated words do not match;
  an operation restriction unit; and
  a display unit configured to make a display,
 wherein, when the authentication unit judges that the battery pack is unauthenticated, the operation restriction unit restricts a part of an operation of the electronic apparatus in order to prohibit a Web function but permit a telephone call function, and the display unit makes a display to indicate that a part of the operation is restricted,
wherein the Web function includes Internet and e-mail functions.

7. The system as claimed in claim 6, wherein the battery pack further includes a nonvolatile memory configured to store the common code key.

8. The system as claimed in claim 7, wherein the common code key stored in the nonvolatile memory is renewed by a new common code key received from the electronic apparatus.

9. The system as claimed in claim 6, wherein the detection unit includes the cryptographic unit as software.

10. The system as claimed in claim 6, wherein the detection unit includes the cryptographic unit as hardware.

11. A method to authenticate a battery pack detachably connected to an electronic apparatus, the method comprising:
in the battery pack,
outputting power from a rechargeable battery;
detecting a remaining battery capacity of the rechargeable battery in a detection unit; and
receiving a request word from the electronic apparatus and outputting a response word by encrypting the request word based on a cryptographic algorithm with a common code key in a cryptographic unit,
wherein the cryptographic unit receives the request word by a first reception unit, encrypts the request word received by the first reception unit by a first encryption unit, and outputs the response word generated by the first encryption unit by a first transmission unit,
in the electronic apparatus,
outputting the request word in response to the power received from the battery pack in a second transmission unit;
receiving the response word from the battery pack in a second reception unit;
encrypting the request word based on a cryptographic algorithm with a common code key identical to those used by the first authentication unit of the battery pack in a second encryption unit;
collating the encrypted request word encrypted by the second encryption unit and the response word in order to judge in an authentication unit that the battery pack is authenticated when the collated words match and that the battery pack is unauthenticated when the collated words do not match; and
when the authentication unit judges that the battery pack is unauthenticated, restricting a part of an operation of the electronic apparatus by an operation restriction unit in order to prohibit a Web function but permit a telephone call function, and making a display by a display unit to indicate that a part of the operation is restricted,
wherein the Web function includes Internet and e-mail functions.

12. The method as claimed in claim 11, further including, in the battery pack, storing the common code key in a nonvolatile memory.

13. The method as claimed in claim 12, further including, in the battery pack, renewing the common code key stored in the nonvolatile memory by a new common code key received from the electronic apparatus.

14. The method as claimed in claim 11, wherein the detecting uses the detection unit including the cryptographic unit as software.

15. The method as claimed in claim 11, wherein the detecting uses the detection unit including the cryptographic unit as hardware.

* * * * *